June 27, 1939. E. R. PRICE 2,164,001
BRAKE
Filed June 13, 1938 2 Sheets—Sheet 2

INVENTOR.
EARL R. PRICE
BY Jerome R. Cox.
ATTORNEY.

Patented June 27, 1939

2,164,001

UNITED STATES PATENT OFFICE 2,164,001

BRAKE

Earl R. Price, South Bend, Ind., assignor to Bendix Products Corporation, South Bend, Ind., a corporation of Indiana Application June 13, 1938, Serial No. 213,410

2 Claims. (Cl. 188—152)

This invention relates to brakes and especially to a power braking system.

This application discloses structure in some respects similar to that of my copending application Serial No. 199,787, filed April 4, 1938, and has for its object the provision of a novel system for applying brakes by means of a vacuum suspended vacuum power cylinder including a valve adapted to exert a force on the brake pedal proportional to the force exerted by the cylinder on the brakes.

This and other objects and desirable particular arrangements of parts will become apparent upon reference to the following detailed description of one embodiment of my invention shown in the accompanying drawings, in which.

Figure 1:
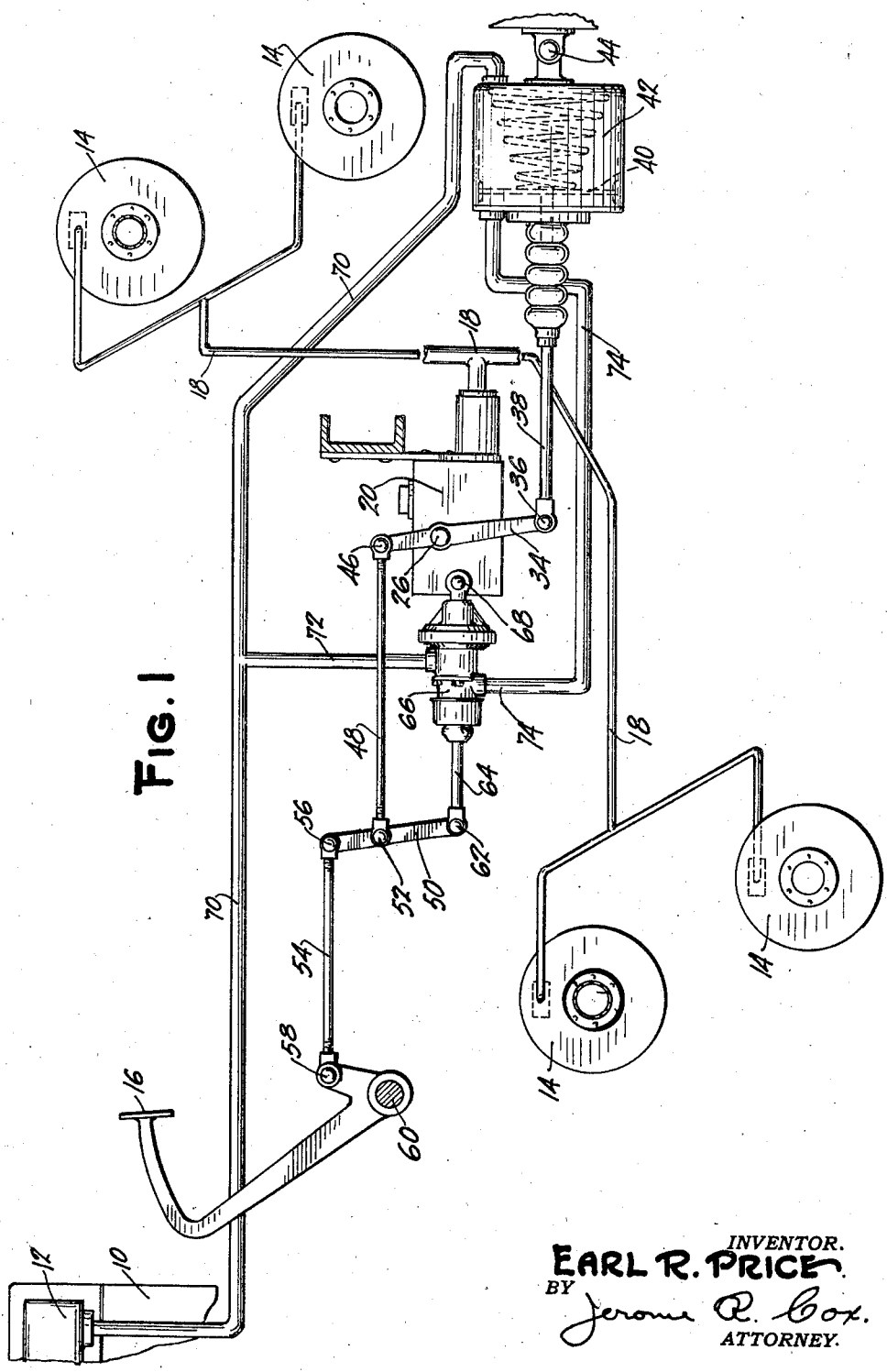
Figure 1 is a diagrammatic view of my novel braking system.
Figure 2:
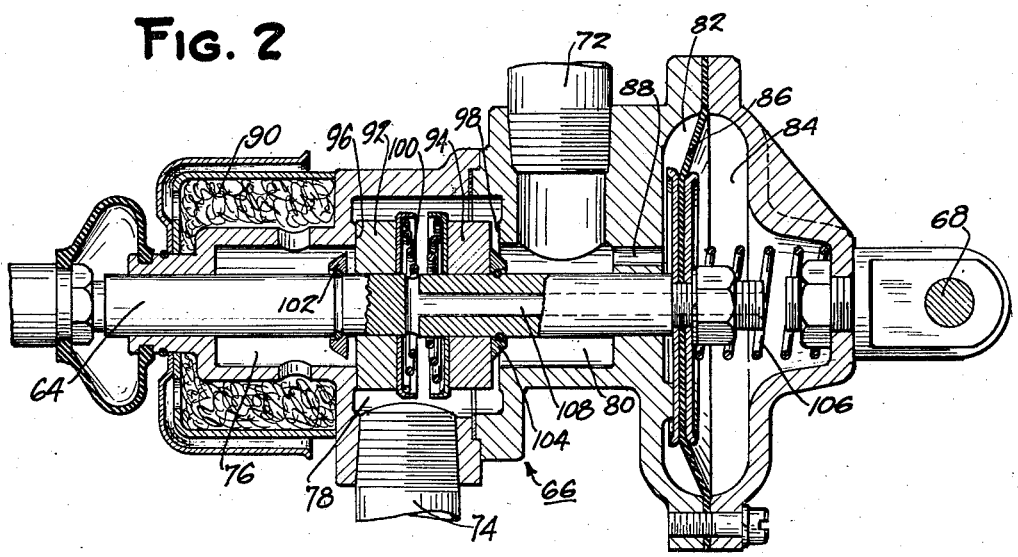
Figure 2 is a longitudinal section on a larger scale through the brake control valve shown in Figure 1.

Referring to the drawings, it may be seen that I have shown in Figure 1 portions of an automobile comprising the usual internal combustion engine 10 having an intake manifold 12 providing a source of vacuum power, four-wheel hydraulic brakes 14, and a brake pedal 16.

Figure 3:
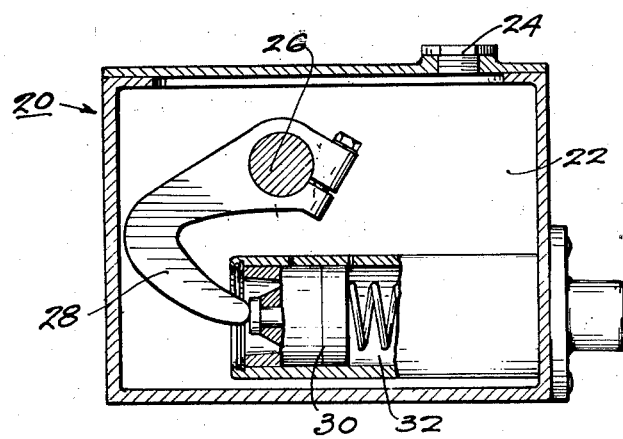
Figure 3 is a partial section of the master cylinder shown in Figure 1.

The brakes are adapted to be operated by fluid pressure transmitted through conduits 18 from a master cylinder 20 fixedly mounted on the chassis and shown in detail in Figure 3 as comprising a generally rectangular reservoir 22, having a filling cap 24 and a transverse cross-shaft 26 journaled therein. The cross-shaft carries a lever 28 adapted to engage a piston 30 slidable in a cylinder 32 submerged in the liquid of the reservoir.

Externally of the cylinder a lever 34 is secured to the shaft 26 intermediate its ends and one end thereof is pivoted at 36 to the piston rod 38 and piston 40 of a vacuum power cylinder 42 swingably mounted at 44 on a fixed part of the vehicle. The other end of the lever 34 is pivoted at 46 to a link 48 extending forwardly to a floating valve lever 50 pivoted thereto intermediate its ends at 52.

A second link 54 is pivoted at the upper end of the valve lever 50 by a pivot 56 and extends forwardly and is pivotally connected to the brake pedal at 58. The brake pedal is mounted on a fixed pivot 60. The lower end of the valve lever 50 is pivotally connected at 62 to a valve plunger 64 extending into a novel control valve 66 pivoted on a fixed part of the chassis, here shown as the reservoir 22 of the master cylinder 20, by a pivot pin 68.

A vacuum conduit 70 connects the intake manifold 12 to the rear end of the power cylinder 42, a second conduit 72 connects the valve to the conduit 70, and a third conduit 74 connects the valve to the forward end of the power cylinder 42.

The novel valve 66 is more fully described and is claimed in my above identified application, and comprises suitable casing members arranged to enclose in sequence an air chamber 76, a controlled pressure chamber 78, a vacuum chamber 80, and a pair of diaphragm chambers 82 and 84 separated by a diaphragm 86. The vacuum chamber 80 communicates continuously by a passage 88 with the diaphragm chamber 82, and with the conduit 72. The controlled pressure chamber 78 communicates with the conduit 74 and the air chamber 76 communicates with the atmosphere through an air filter 90.

The valve plunger 64 extends coaxially through the chambers and has its inner end connected to the diaphragm 86. Slidably mounted on the plunger are a pair of valve disks 92 and 94 urged away from each other into contact with valve seats 96 and 98 by a spring 100.

The valve seats 96 and 98 surround parts leading from the air and vacuum chambers respectively to the controlled pressure chamber. A pair of spaced abutments 102 and 104 secured to the plunger act, upon movement of the plunger in the appropriate direction, to alternately lower and lift the valve disks 92 and 94 to and from their respective seats.

A spring 106 acting on the end of the plunger 64 normally urges it outwardly whereby the valve disk 94 is lifted and the disk 92 is lowered admitting vacuum to the chamber 78.

The abutments 102 and 104 are preferably spaced apart sufficiently so that in one position of the plunger, both valve disks are seated. This is called the "lapped" position of the valve.

A longitudinal passage 108 in the valve plunger 64 provides communication between the controlled pressure chamber 78 and the diaphragm chamber 84 whereby in the normal position of the valve vacuum exists on both sides of the diaphragm 86.

In operation, depression of the pedal 16 swings the valve lever 50 in a counterclockwise direction about the pivot 52 as a fulcrum, forcing the valve plunger to the right against the force of the spring 106 whereby the valve disk 94 is lowered and the disk 92 is raised by the abutment 102. Thus, air is admitted to the controlled pressure chamber 78 and from there to the forward end of the power cylinder 42 by the conduit 74 and to the diaphragm chamber 86 by the passage 108.

The air pressure on the forward side of the piston 40 forces it into the cylinder 42 and swings the power lever 34 in a counterclockwise direction to apply the brakes 14.

The air pressure on the diaphragm 86 tends to force the plunger 64 to the left in opposition to its initial operating movement and this force reacts on the pedal 16 through the valve lever 50 and the link 54.

If depression of the pedal 16 is stopped, continued movement of the piston 40 and counterclockwise movement of the power lever 34 moves the valve lever 50 in a clockwise direction about the pivot 56 as a fulcrum and brings the valve into "lapped" position.

The force of the air pressure on the diaphragm is proportional to the force of the piston 40 on the brakes but is much smaller because of the much smaller area of the diaphragm. The force is multiplied somewhat by the lever 50, and at the same time the movement of the pedal is multiplied at the valve to give quicker valve action.

It will be noted that the connection of the pedal 16 to the power lever provides a movement of the pedal proportionate to the movement of the power lever in applying the brakes.

Upon release of the pedal 16, the valve lever 50 swings in a clockwise direction about the pivot 52 as a fulcrum, permitting the plunger 64 to move to the left under the influence of the spring 106, and thereby lowering the valve disk 92 on its seat 96 and raising the valve 94 from its seat 98 to admit vacuum to the controlled pressure chamber 78.

The vacuum is transmitted by the conduit 74 to the forward side of the piston 40 to balance the pressures thereon and permit it to return to its released position under the influence of suitable return springs.

While one embodiment of my invention has been described in detail, it is not my intention to be limited to that embodiment or otherwise than by the terms of the appended claims.

I claim:

1. In an automotive vehicle, a braking system comprising brakes, a brake pedal, a first link extending rearwardly from the pedal to one end of a floating valve lever, a control valve having operating means connected to the other end of the lever, a second link connected intermediate the ends of the lever and extending to a power lever arranged to apply the brakes, a vacuum suspended power cylinder connected to said power lever, a source of vacuum, a conduit connecting the source of vacuum to one end of the power cylinder, a second conduit connecting the source of vacuum to the valve, and a third conduit connecting the valve to the other end of the power cylinder, said valve having valve elements and means normally holding said valve elements in a position permitting vacuum to pass from the second to the third conduit when the pedal is released, said valve having a pressure responsive element subjected on both sides to vacuum when the valve is in its normal position, said valve being operable upon depression of the pedal to admit air to said third conduit and to one side of the pressure responsive element, and said pressure responsive element being connected to the operating means to oppose valve operating movement when air is admitted thereto.

2. In an automotive vehicle, a braking system comprising brakes, a brake pedal, a first link extending rearwardly from the pedal to one end of a floating valve lever, a control valve having operating means connected to the other end of the lever, a second link connected intermediate the ends of the lever and extending to a power lever arranged to apply the brakes, a vacuum suspended power cylinder connected to said power lever, a source of vacuum, a conduit connecting the source of vacuum to one end of the power cylinder, a second conduit connecting the source of vacuum to the valve, and a third conduit connecting the valve to the other end of the power cylinder, said valve having valve elements and means normally holding said valve elements in a position permitting vacuum to pass from the second to the third conduit when the pedal is released, said valve having a pressure responsive element subjected on both sides to vacuum when the valve is in its normal position, said valve being operable upon depression of the pedal to admit air to said third conduit and to one side of the pressure responsive element, said pressure responsive element being connected to the operating means to oppose valve operating movement when air is admitted thereto, and said second link being connected to the floating valve lever closer to the first link than to the valve operating means.

EARL R. PRICE.